United States Patent
Fawcett et al.

(10) Patent No.: US 7,526,058 B2
(45) Date of Patent: Apr. 28, 2009

(54) ROD ASSEMBLY FOR NUCLEAR REACTORS

(75) Inventors: Russell Morgan Fawcett, Atkinson, NC (US); Randy Peter Gonzales, Wilmington, NC (US); Russell Patrick Higgins, Wilmington, NC (US); Robert Bryant James, Wilmington, NC (US); Michael Thomas Kiernan, Wilmington, NC (US); William Earl Russell, II, Wilmington, NC (US); Steven Bruce Shelton, Wilmington, NC (US); David Grey Smith, Leland, NC (US); Russell Edward Stachowski, Wilmington, NC (US); Lukas Trosman, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 11/002,677

(22) Filed: Dec. 3, 2004

(65) Prior Publication Data

US 2007/0133734 A1    Jun. 14, 2007

(51) Int. Cl.
G21C 3/30    (2006.01)
(52) U.S. Cl. .................. 376/426; 376/412; 376/429
(58) Field of Classification Search ........... 376/426, 376/170, 156, 429, 412
See application file for complete search history.

(56) References Cited

U.S. PATENT DOCUMENTS

| 3,940,318 | A | * | 2/1976 | Arino et al. ............ 205/48 |
| 3,998,691 | A | | 12/1976 | Shikata et al. |
| 4,196,047 | A | | 4/1980 | Mitchem et al. |
| 4,284,472 | A | | 8/1981 | Pomares et al. |
| 4,462,956 | A | | 7/1984 | Boiron et al. |
| 4,475,948 | A | | 10/1984 | Cawley et al. |
| 4,493,813 | A | | 1/1985 | Loriot et al. |
| 4,532,102 | A | | 7/1985 | Cawley |
| 4,597,936 | A | | 7/1986 | Kaae |
| 4,617,985 | A | | 10/1986 | Triggs et al. |
| 4,663,111 | A | | 5/1987 | Kim et al. |
| 4,702,881 | A | * | 10/1987 | Weiland et al. ......... 376/442 |
| 4,729,903 | A | | 3/1988 | McGovern et al. |
| 4,782,231 | A | | 11/1988 | Svoboda et al. |
| 4,859,431 | A | | 8/1989 | Ehrhardt |
| H000689 | H | * | 10/1989 | Christiansen et al. ..... 376/361 |
| 5,009,837 | A | * | 4/1991 | Nguyen et al. ......... 376/261 |
| 5,053,186 | A | | 10/1991 | Vanderheyden et al. |
| 5,082,617 | A | * | 1/1992 | Walter et al. ........... 376/184 |
| 5,145,636 | A | | 9/1992 | Vanderhevden et al. |

(Continued)

*Primary Examiner*—Rick Palabrica
(74) *Attorney, Agent, or Firm*—Harness, Dickey & Pierce, PLC

(57) ABSTRACT

A rod assembly for a fuel bundle of a nuclear reactor may include an upper end piece, lower end piece and a plurality of rod segments attached between the upper and lower end pieces and to each other so as to form an axial length of the rod assembly. The rod assembly may include an adaptor subassembly provided at given connection points for connecting adjacent rod segments or a given rod segment with one of the upper and lower end pieces. The connection points along the axial length of the rod assembly may be located where the rod assembly contacts a spacer in the fuel bundle. One (or more) of the rod segments may include an irradiation target therein for producing a desired isotope when a fuel bundle containing one (or more) rod assemblies is irradiated in a core of the reactor.

14 Claims, 12 Drawing Sheets

U.S. PATENT DOCUMENTS

| | | | |
|---|---|---|---|
| 5,182,077 A * | 1/1993 | Feinroth | 376/416 |
| 5,349,618 A * | 9/1994 | Greenspan | 376/429 |
| 5,355,394 A | 10/1994 | Van Geel et al. | |
| 5,400,375 A | 3/1995 | Suzuki et al. | |
| 5,513,226 A * | 4/1996 | Baxter et al. | 376/170 |
| 5,596,611 A | 1/1997 | Ball | |
| 5,615,238 A * | 3/1997 | Wiencek et al. | 376/202 |
| 5,633,900 A | 5/1997 | Hassal | |
| 5,682,409 A | 10/1997 | Caine | |
| 5,758,254 A | 5/1998 | Kawamura et al. | |
| 5,867,546 A | 2/1999 | Hassal | |
| 5,871,708 A | 2/1999 | Park et al. | |
| 5,910,971 A | 6/1999 | Ponomarev-Stepnoy et al. | |
| 6,056,929 A | 5/2000 | Hassal | |
| 6,160,862 A | 12/2000 | Wiencek et al. | |
| 6,192,095 B1 * | 2/2001 | Sekine et al. | 376/189 |
| 6,229,868 B1 * | 5/2001 | Nylund et al. | 376/433 |
| 6,233,299 B1 | 5/2001 | Wakabayashi | |
| 6,456,680 B1 | 9/2002 | Abalin et al. | |
| 6,678,344 B2 * | 1/2004 | Mays et al. | 376/170 |
| 6,751,280 B2 | 6/2004 | Beets et al. | |
| 6,804,319 B1 | 10/2004 | Mirzadeh et al. | |
| 6,888,911 B2 * | 5/2005 | Stabel-Weinheimer et al. | 376/438 |
| 6,895,064 B2 | 5/2005 | Ritter | |
| 6,896,716 B1 | 5/2005 | Jones, Jr. | |
| 7,157,061 B2 | 1/2007 | Meikrantz et al. | |
| 7,235,216 B2 | 6/2007 | Kiselev et al. | |
| 2002/0034275 A1 | 3/2002 | Abalin et al. | |
| 2003/0012325 A1 | 1/2003 | Kernert et al. | |
| 2003/0016775 A1 | 1/2003 | Jamriska, Sr. et al. | |
| 2003/0103896 A1 | 6/2003 | Smith | |
| 2003/0179844 A1 * | 9/2003 | Filippone | 376/208 |
| 2004/0091421 A1 | 5/2004 | Aston et al. | |
| 2004/0105520 A1 | 6/2004 | Carter | |
| 2004/0196942 A1 | 10/2004 | Mirzadeh et al. | |
| 2004/0196943 A1 | 10/2004 | Di Caprio | |
| 2005/0105666 A1 | 5/2005 | Mirzadeh et al. | |
| 2005/0118098 A1 | 6/2005 | Vincent et al. | |
| 2006/0062342 A1 | 3/2006 | Gonzalez Lepera et al. | |
| 2006/0126774 A1 | 6/2006 | Kim et al. | |
| 2007/0133731 A1 | 6/2007 | Fawcett et al. | |
| 2007/0297554 A1 | 12/2007 | Lavie et al. | |
| 2008/0031811 A1 | 2/2008 | Ryu et al. | |
| 2008/0076957 A1 | 3/2008 | Adelman | |

* cited by examiner

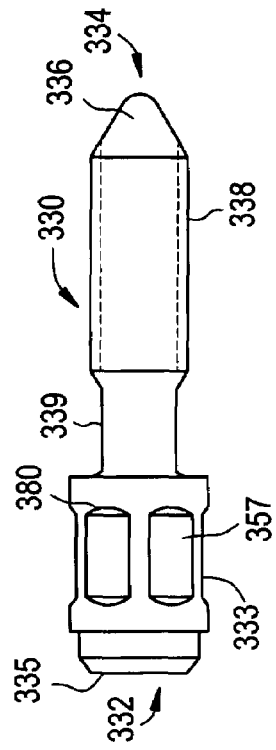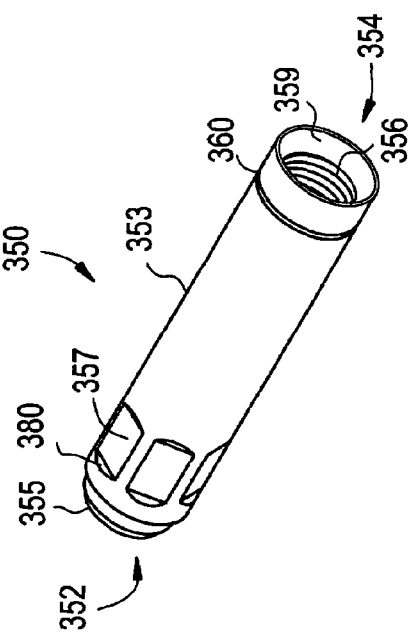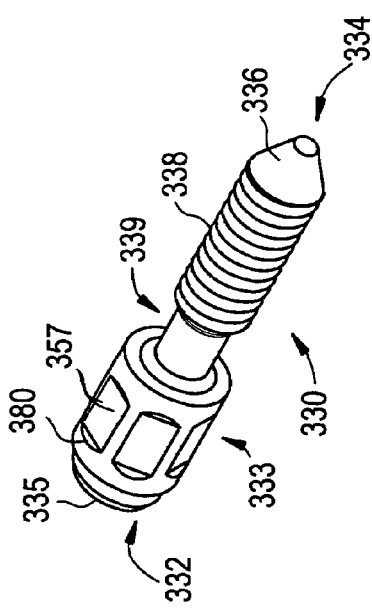

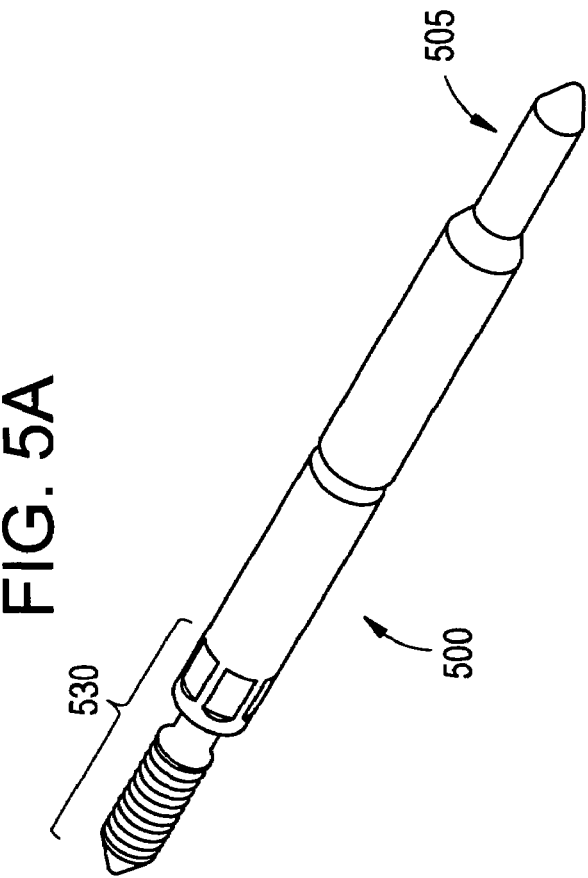
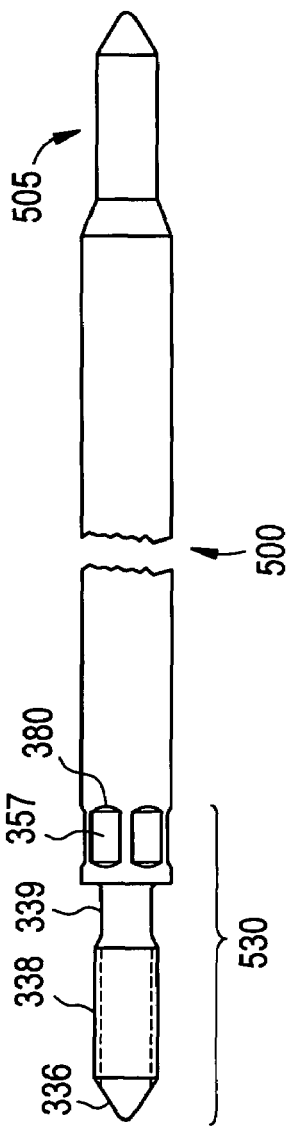

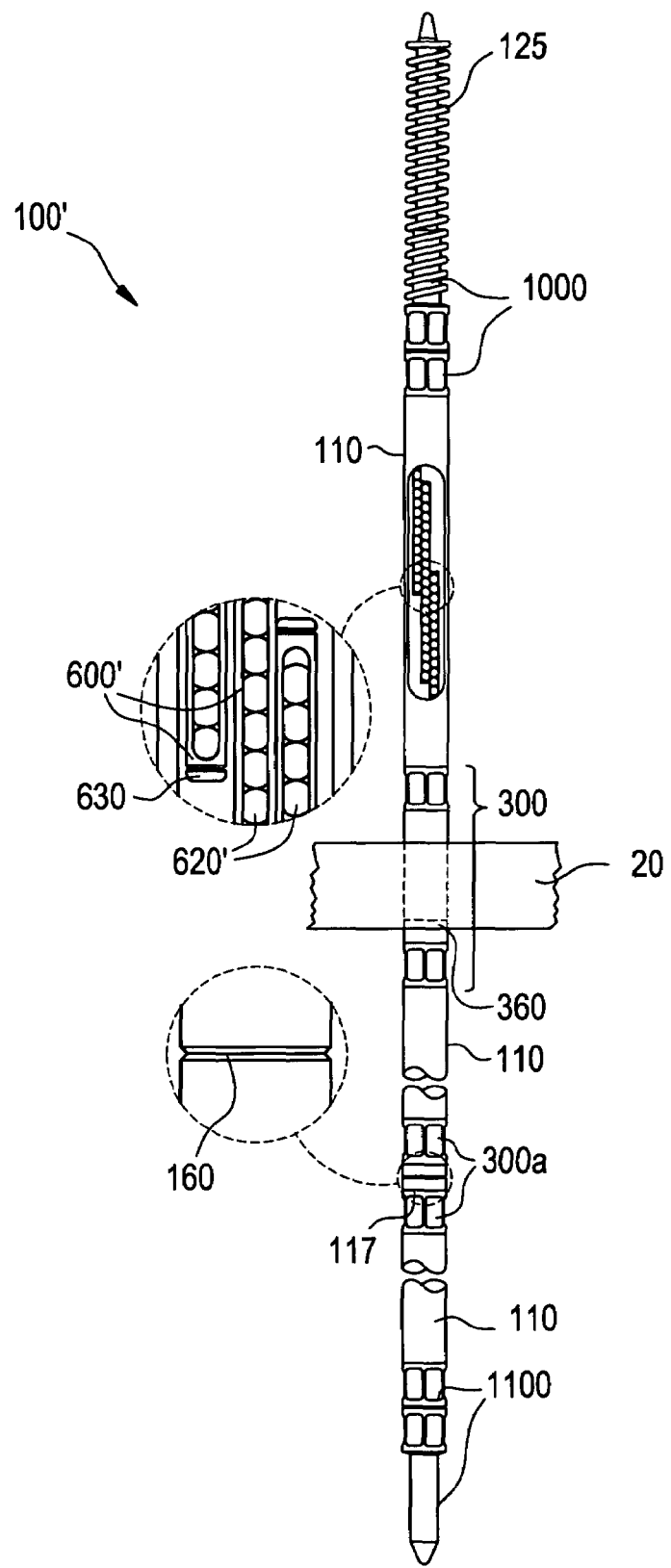

US 7,526,058 B2

ROD ASSEMBLY FOR NUCLEAR REACTORS

BACKGROUND OF THE INVENTION

1. Field of the Invention

This invention relates generally to nuclear reactors, and more particularly to a rod assembly for a nuclear reactor.

2. Description of the Related Art

A continuing problem during operation of a nuclear reactor is the existence of debris of various sizes. Examples of such debris may include small-sized fasteners, metal clips, welding slag, pieces of wire, etc. The debris may be generated as a result of the original construction of the reactor core, subsequent reactor operation and/or due to repairs made during a planned or unplanned maintenance outage.

During the operation of such nuclear reactors, the debris may be carried by the cooling water (reactor coolant) and may become wedged between or within reactor components such as fuel rods of a fuel assembly in a boiling water reactor (BWR) or pressurized water reactor (PWR), or in control rod assemblies in a PWR, etc. The repeated interaction between the entrained debris and component(s) can result in fretting damage to the component(s), such as damage to the fuel rods.

Some of the debris may be caught between the fuel rods and other fuel assembly components. The debris vibrates in the moving coolant and interacts with the fuel rods, potentially causing what is known as fretting wear of the fuel rod cladding. This fretting may be recognized as a significant cause of failure of the fuel rod in a BWR or PWR, for example.

Conventional solutions have included employing the use of debris filters to filter the debris from the reactor coolant. These are typically positioned in the lower tie plate or nozzle of a fuel assembly and so are replaced when the fuel is discharged. Debris filtering devices have also been introduced into the nuclear plant piping system. However, the debris filter and/or external filter mechanisms do not completely obviate the fretting problem in nuclear reactors. Fretting still may occur and cause fuel failures, which may release fuel, fission products or other rod contents into the coolant, potentially leading to the premature withdrawal from service of the fuel assembly or costly mid-cycle fuel replacement.

SUMMARY OF THE INVENTION

Exemplary embodiments of the present invention are directed to a rod assembly for a fuel bundle of a nuclear reactor. The rod assembly may include an upper end piece, lower end piece and a plurality of rod segments attached between the upper and lower end pieces and to each other so as to form an axial length of the rod assembly. The rod assembly may include an adaptor subassembly provided at given connection points for connecting adjacent rod segments or a given rod segment with one of the upper and lower end pieces. The connection points along the axial length of the rod assembly may be located where the rod assembly contacts a spacer in the fuel bundle. One (or more) of the rod segments may include an irradiation target therein for producing a desired isotope when a fuel bundle containing one (or more) rod assemblies is irradiated in a core of the reactor.

BRIEF DESCRIPTION OF THE DRAWINGS

The present invention will become more apparent by describing, in detail, exemplary embodiments thereof with reference to the attached drawing, wherein like elements are represented by like reference numerals, which are given by way of illustration only and thus do not limit the exemplary embodiments of the present invention.

FIGS. 3A and 3B are perspective and side-view profiles illustrating the male adaptor subassembly for the rod assembly in accordance with an exemplary embodiment of the invention.

FIGS. 4A and 4B are perspective and side-view profiles illustrating the female adaptor subassembly in accordance with an exemplary embodiment of the present invention.

FIGS. 5A and 5B are perspective and side-view profiles illustrating an exemplary lower end piece of the rod assembly in accordance with an exemplary embodiment of the invention.

FIG. 7 illustrates a rod assembly for a fuel bundle in accordance with another exemplary embodiment of the invention.

DETAILED DESCRIPTION OF THE EXEMPLARY EMBODIMENTS

Figure 1A:
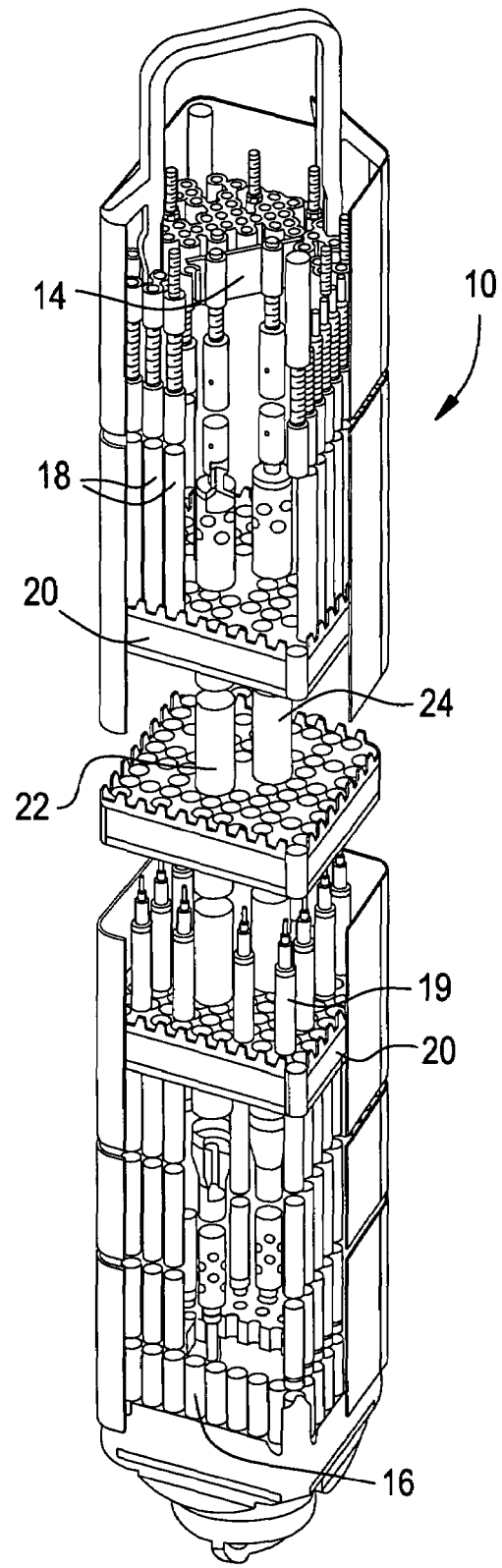
FIG. 1A illustrates an exemplary fuel bundle of a nuclear reactor.

FIG. 1A illustrates an exemplary fuel bundle of a nuclear reactor such as a BWR. Fuel bundle 10 may include an outer channel 12 surrounding an upper tie plate 14 and a lower tie plate 16. A plurality of full length fuel rods 18 and/or part length fuel rods 19 may be arranged in a matrix within the fuel bundle 10 and pass through a plurality of spacers (also known as spacer grids) 20 vertically spaced one from the other maintaining the rods 18, 19 in the given matrix thereof.

The fuel rods 18 and 19 with at least a pair of water rods 22 and 24 may be maintained in spaced relation to each other in the fuel bundle 10 by a plurality of spacers 20 provided at different axial locations in the fuel bundle 10 so as to define passages for reactor coolant flow between fuel rods 18, 19 in the fuel bundle 10. There may typically be between five to eight spacers 20 spaced along the entire axial length of the fuel bundle 10 for maintaining the fuel rods 18, 19 in the desired array thereof. Spacer 20 may be embodied as any type of spacer, for example, ferrule-type spacers or spacers of the type described and illustrated in U.S. Pat. No. 5,209,899.

In FIG. 1A, the matrix may be a 10×10 array, although the illustrative fuel bundle 10 may have a different matrix array of rods 18, 19 such as a 9×9 array. The bundle 10 may include all full length fuel rods 18 and/or a combination of full 18 and part length 19 fuel rods, as is known. Each of the full length fuel rods 18 and part length fuel rods 19 is cladded, as is known in the art. The water rods 22 and 24 (two are shown, there may be more or less water rods in bundle 10) may be dispersed among the fuel rods 18, 19 in bundle 10, between the lower tie plate 16 and the upper tie plate 14. The water rods 22, 24 serve to transfer fluid from the lower regions of the nuclear fuel bundle 10 to the upper regions, where the water is dispersed through openings located at the top of the water rods, as shown.

Figure 1B:
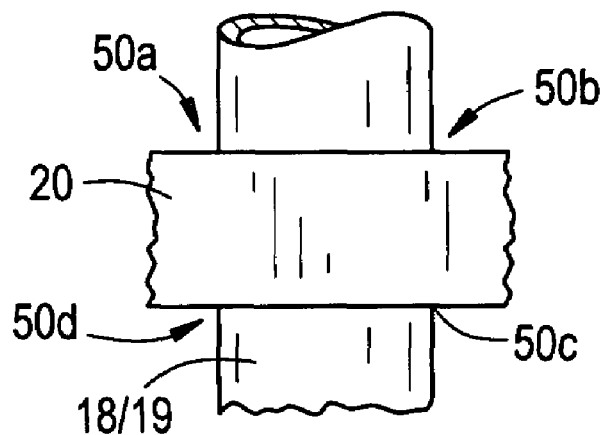
FIG. 1B illustrates a spacer-to-rod contact area within the fuel bundle, showing where debris might become lodged or entrained within the fuel bundle of FIG. 1A.

FIG. 1B illustrates a spacer to rod location in the fuel bundle 10 of FIG. 1A. In particular, FIG. 1B illustrates exemplary debris catching areas 50a-50d between a given fuel rod 18 and spacer 20 to show where debris might be caught or entrained so as to exacerbate the fretting problem.

Figure 1C:
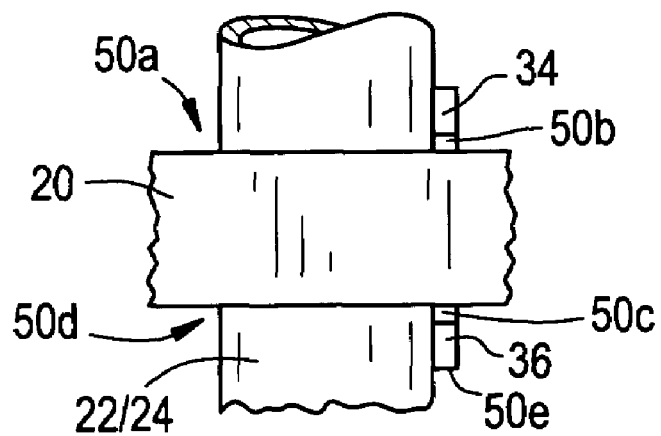
FIG. 1C illustrates a spacer that is restrained between the tabs of a tabbed water rod and the contact areas within a spacer where debris might become lodged or entrained within the fuel bundle of FIG. 1A.

FIG. 1C illustrates a spacer to water rod location in the fuel bundle 10 of FIG. 1A and exemplary debris catching areas 50a-50e between a given water rod 22, 24 and spacer 20 to show where debris might become lodged or entrained so as to potentially causing fretting with an adjacent rod 18, 19. The water rods 22 and 24 are bound by a spacer 20. Spacer 20 is bound by a pair of radial directed flanges or tabs 34 and 36 which lie on opposite sides of the spacer 20, to maintain the spacer at the desired elevation. During reactor power operations, debris may be carried by the reactor coolant and may become lodged in and around the circumference of the water rods 22, 24 and spacer 20 within bundle 10. The repeated interaction between the entrained debris at spacer 20 and the water rods 22, 24 can result in the aforementioned fretting wear and potential damage to the adjacent rods 18, 19 and/or the water rods 22, 24.

Figure 2A:
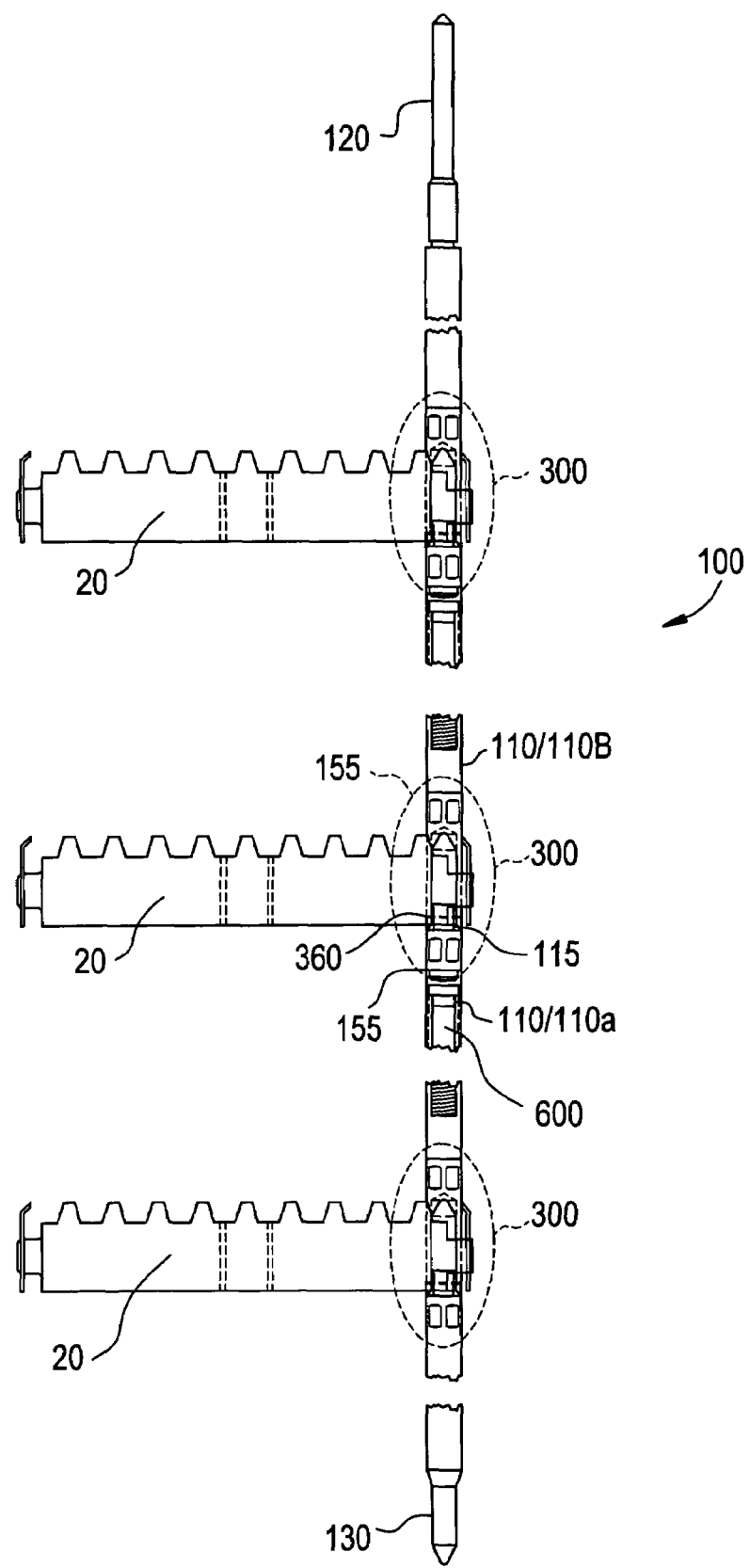
FIG. 2A illustrates a rod assembly for a fuel bundle in accordance with an exemplary embodiment of the invention.

FIG. 2A illustrates a rod assembly 100 for a fuel bundle 10 in accordance with an exemplary embodiment of the invention. In an effort to provide a fretless rod designed so as to substantially eliminate fretting wear as described in a conventional art, there is described a rod assembly 100 (also occasionally referred to as a multi-segment rod or multi-part rod) that includes a plurality of parts or cladded rod segments 110. As shown in FIG. 2A, a rod assembly 100 may include a plurality of rod segment 110 (two adjacent rod segments shown as 110a and 110b) between an uppper end piece 120 and a lower end piece 130. The upper end piece 120 and lower end piece 130 may include threads to mate with the lower and upper tie plates of the fuel bundle 10 (not shown), as is known. Adjacent rod segments 110a, 110b may be interconnected to each other via at least one adaptor subassembly, shown generally as a subassembly 300 within the dotted line circle of FIG. 2A. Only one rod assembly 100 is shown in FIG. 2A, it being understood that one or more of the rod assemblies 100 shown in FIG. 2A may be inserted into a fuel bundle such as the bundle 10 shown in FIG. 1A.

Rod segments 110 may be attached between the upper and lower end pieces 120, 130 and to each other so as to form the entire axial length of the rod assembly 100. In an example, a rod segment 110a, a rod segment 110b and one each of the upper and lower end pieces 120, 130 may be connected by adaptor subassemblies 300 at connections points along the axial length of the rod assembly 100 where the rod assembly contacts spacers 20. Although only three spacers 20 and adaptor subassemblies 300 are shown in FIG. 2A for reasons of brevity, it should be understood that the fuel bundle 10 could include one or more rod assemblies 100, each having at least one rod segment 110a and at least one rod segment 110b connected by adaptor subassemblies 300 at any number of spacer 20 locations. The rod segments 110a, 110b may be fixed length segments to facilitate the manufacturing process. Similarly, the adaptor subassemblies 300 may also be manufactured at a fixed size so as to be of equal lengths.

In this exemplary embodiment, the rod segments and adaptor subassemblies are constructed of a material which is corrosion resistant and compatible with the other reactor components. An exemplary material may be a zirconium alloy, for example.

Desirably, a portion of each spacer 20 contacts the rod assembly 100 at each of the adaptor subassemblies 300 so as to substantially cover adaptor subassemblies 300 and/or connection points 115 between rod segments 110, or substantially covers an adaptor subassembly 300 or connection point 115 connecting a given rod segment 110 and one of the upper and lower end pieces 120 and 130. Accordingly, the consequences of fretting of the rod assembly 100 at these points 115 and/or adaptor subassemblies 300 within a given spacer 20 may be eliminated. While fretting may still occur, the fretting wear on the rod assembly 100 occurs on the adaptor subassembly 300, instead of on a segment 110a, b. Accordingly, this may eliminate to potential release of contents from within a given rod segment 110 to the reactor coolant.

FIG. 2A illustrates an exemplary adaptor subassembly 300 between adjacent rod segments 110a and 100b in transparent detail (i.e., phantom lines illustrate components within rod segments 110 and/or adaptor subassemblies 300) so as to show weld points 155 between an adjacent rod segment 110b and a part of the adaptor subassembly 300. FIG. 2A also illustrates (in phantom) an optional container assembly 600 provided within one or more of the rod segments 110 for applications described in detail hereafter. The rod segments may or may not include a container assembly 600 therein. Additionally, in FIG. 2A, there is illustrated an undercut portion or recessed break line 360. As will be described in further detail below, the recessed break line 360 provides an alternative location to break a particular adaptor subassembly 300/rod segment 110 in order to remove a particular rod segment 110 from the rod assembly 100, which may be desirable to reduce length in transport, etc., for example.

Figure 13:
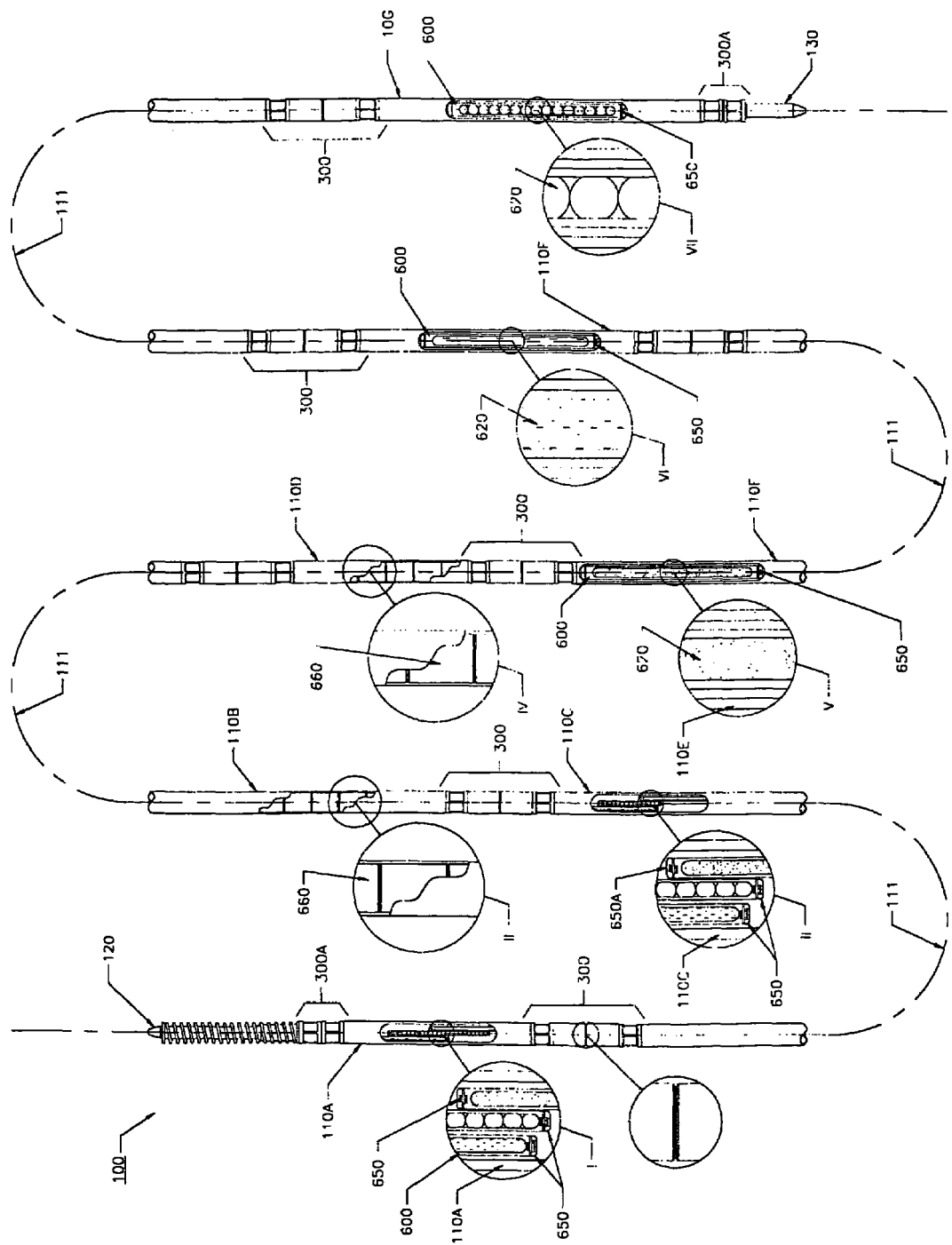
FIG. 13 illustrates the multi-segmented fuel rod 100 of FIG. 2A in further detail.

As shown in FIG. 13, which illustrates the multi-segmented fuel rod 100 of FIG. 2A. The multi-segmented fuel rod 100 is broken up into various segments 110A, 110B, 110C, 110D, 110E, 110F and 110G that connect to each other via a corresponding adaptor subassembly 300 at connection points 115 (as previously shown) to form a contiguous multi-segmented fuel rod 100' (as evident by the dotted connection lines 111 in FIG. 13). FIG. 13 also illustrates enlargements of cross-sectional views I-VII of the target container 600 in each of segments 110A, 110C, 110E, 110F and 110G of the multi-segmented rod 100.

Views I and II show a plurality of containment structures 600 within rod 100 that are housing multiple different targets, shown as a liquid, solid and a gas target 620 within a single rod segment 110A. Further, enlargements I and II illustrate indicia 650 that can be placed on the containment structures 600 within a given rod segment 110A, 110C, 110E, etc. As shown, the indicia 650 can indicate whether or not the target is in solid, liquid or gas form, and can also provide the name of the target isotope and/or the name of the isotope to be produced due to irradiation, for example (not shown in FIG. 13 for purposes of clarity).

Rod segments 110B and 110D are shown to contain nuclear fuel 660, as shown in enlargements III and IV, for example. Of course in an alternative, multi-segmented rod 100 can be composed of a plurality of rod segments 110 in which no segment 110 includes nuclear fuel, as previously described. Enlargement V of rod segment 110e illustrates a container assembly 600 which includes a target that is in gaseous form. Enlargement VI of rod segment 110F illustrates a container assembly 600 within the rod segment 110f that includes a target 620 in liquid form. Enlargement VII of rod segment 110G illustrates a container assembly 600 which includes a solid target 620, shown as a single column of Co-59 BBs, which can be irradiated to produce the desire isotope, in this case, Co-60. Each of the container assemblies 600 can thus be prepackaged with the target 620 isotope material in solid, liquid or gas form, for insertion into a corresponding rod segment 110 of the multi-segmented rod 100, for example.

Further, since each of the container assemblies 600 are sealed by end plugs 630 at one end 612 and by exterior threads 601 and an O-ring 602 at the first end 611 (as previously shown in FIGS. 6A, 6D and 6E), the removal of a particular segment 110 at its connection point 115 (i.e., at the disconnection of the adapter subassembly 300 at connection point 115 between two segments 110) will not cause a breach which would expose the irradiation target 620 to the reactor coolant. Thus, the container assembly 600' together with the outer cladding of the rod segment 110 provides a double-walled containment for the irradiation target 620.

Figure 2B:
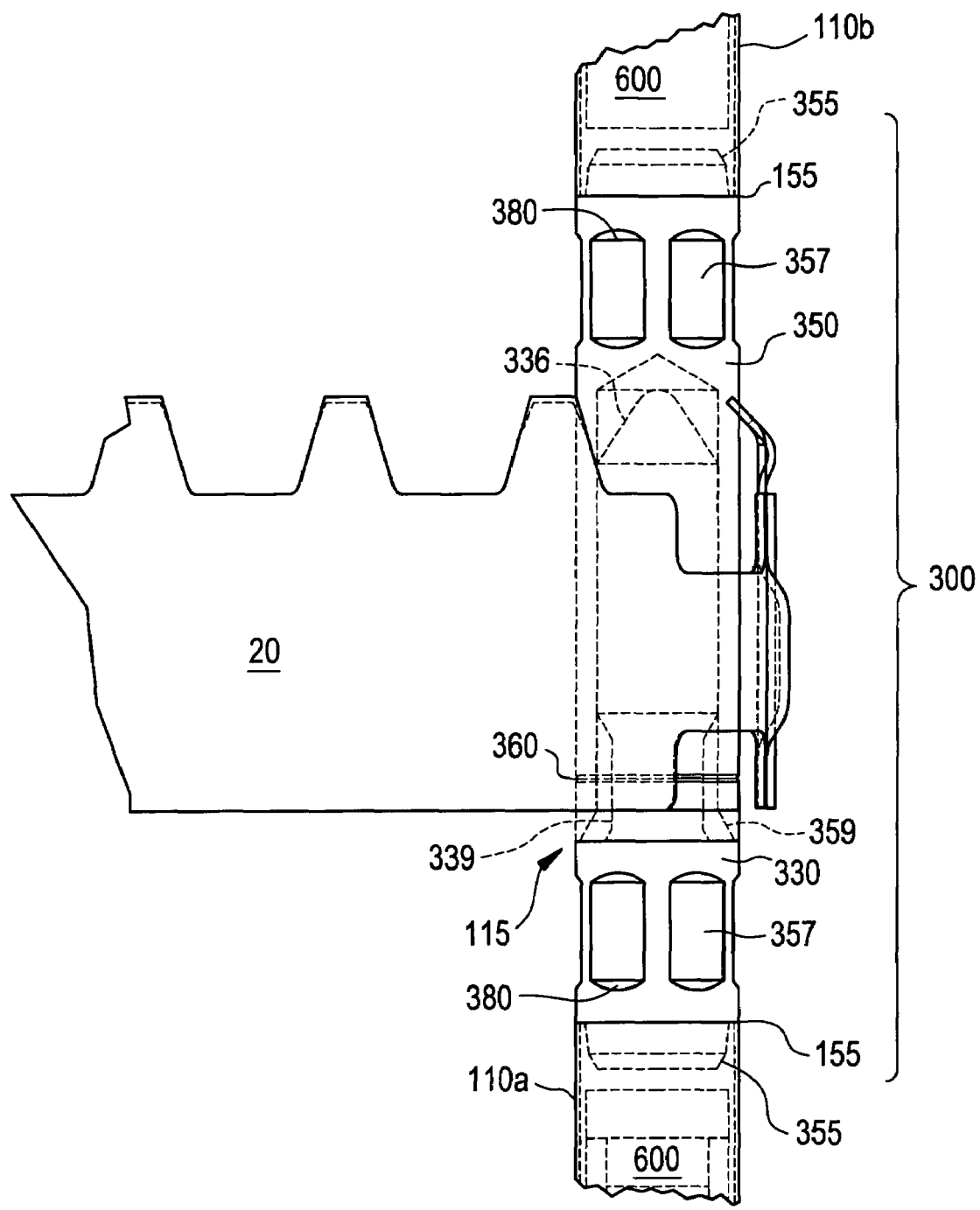
FIG. 2B illustrates an exploded view of a portion of FIG. 2A to illustrate the rod assembly in further detail.

FIG. 2B illustrates an exploded view of a portion of FIG. 2A to illustrate the rod assembly in further detail. Portions of FIG. 2B are also shown in phantom (dotted lines) to indicate components within an interior of a rod segment 110a, 110b or subassembly 300. The adaptor subassembly 300 may include a male adaptor plug 330 that is attached to a rod segment 110a via a weld at weld joint 155. Similarly, the adaptor subassembly 300 may include a female adaptor plug 350 which may be attached at one end to a rod segment 110b via a weld at weld joint 155. Both the male and female adaptor plugs 330, 350 may include a plurality of nut-shaped depressions 357 around an outer circumference thereof. In general, the depressions 357 may facilitate removal/disassembly of a given rod segment 110, upper end piece 120 or lower end piece 130 by a suitable tool during a maintenance outage, for example.

In FIG. 2B, the depressions 357 may include recessed angled surfaces at opposite ends thereof, such as angle edges 380, to prevent damage to the spacer 20 during insertion or assembly of the rod assembly 100 into the fuel bundle 10 of the reactor. Further, as shown in dotted line form, each of the male and female adaptor plugs 330 and 350 may include weld alignment members 355 to facilitate inserting the corresponding adaptor plug 330, 350 into an end of a given rod segment 110 for welding the plug 330/350 to the segment 110 at the weld joint 155.

FIGS. 3A and 3B are perspective and side-view profiles illustrating part of an adaptor subassembly for the rod assembly in accordance with an exemplary embodiment of the invention. As shown in FIGS. 3A and 3B, male adaptor plug 330 may be attached (such as by a weld) to rod segment 110 at a first end 332. A second end 334 of male adaptor plug 330 may be inserted into a corresponding chamber or cavity of the female adaptor plug 350. The male adaptor plug 330 may include the aforementioned weld alignment member 335 as part of a cylindrical section 333, which includes the depressions 357 around the circumference thereof with angled edges 380. An intermediate member 339 connects the cylindrical section 333 to an elongate section 338. The elongate section 338 may be threaded, as shown in FIG. 3A. The elongate section 338 tapers into a generally cone-shaped end 336 at the male adaptor plug second end 334. The cone-shaped end 336 represents a self-alignment aid for connecting the female adaptor plug 350 to the male adaptor plug 330 as a single adaptor subassembly 300.

The male adaptor plug 330 may be made of a material that is corrosion resistant and compatible with the other reactor components, such as a zirconium alloy, as is known in the art.

FIGS. 4A and 4B are perspective and side-view profiles illustrating another part of the adaptor subassembly in accordance with an exemplary embodiment of the present invention. As shown in FIGS. 4A and 4B, female adaptor plug 350 has a first end 352 for attachment to a given rod segment 110 (not shown) and a second end 354 for receiving the cone-shaped end 336 and elongate member 338 of the male adaptor plug 330 therein. Female adaptor plug 350 may include weld alignment member 355 and a generally cylindrical section 353, which has a plurality of nut-shaped 357 depressions around the circumference with angled edges 380 at the first end 352 to facilitate removal of the female adaptor plug 350 and/or removal of an adjacent rod segment.

The female adaptor 350 includes an interior cavity 358. A surface of the cavity 358 may include a plurality of mating threads 356 for receiving corresponding threads (see FIG. 3A) on the elongate section 338 of the male adaptor plug 330. The cavity 358 may have a concave angled portion 359 at an end thereof that is configurable as a self-alignment aid for receiving the cone-shaped end 336 to connect male adaptor plug 330 within the female adaptor plug 350.

As shown in FIG. 4B, the cylindrical section 353 of the female adaptor plug 350 may include a recessed break line 360 at second end 354. The recessed break line 360 may also be referred to as an undercut section, for example. Undercutting may be designed into each of the adaptor subassemblies 300 so that a given rod segment 110 may be safely broken down by snapping and/or cutting a section loose without unscrewing the connecting joints 115 of FIG. 2B. This will be illustrated in further detail below.

In another aspect, as the threads of the elongate section 338 engage the corresponding mating threads 356 within the cavity 358 of the female adaptor plug 350, the recessed break line 360 aligns with the intermediate member 339 of the male adaptor plug 330. Since the diameter of the intermediate member 339 is less than a diameter of the cylindrical section 333, this represents a 'weakened area' that facilitates cutting, snapping or breaking of the adaptor subassembly 300 of FIG. 2B at that location. The recessed break line 360 may thus provide a visual identification as to where to cut an adaptor subassembly 330 of FIG. 3B, in the event of segment 110 of FIG. 2B replacement, adaptor subassembly 300 of FIG. 2B replacement, etc.

FIGS. 5A and 5B are perspective and side-view profiles illustrating an exemplary lower end piece of the rod assembly in accordance with an exemplary embodiment of the invention. As shown in FIGS. 5A or 5B, one or both of the upper and lower end pieces 120 and 130 of FIG. 2A may be formed as a solid end piece assembly 500. The solid end piece assembly may be made of a solid metal material for example. End piece assembly 500 may include an end plug portion 505 at one end thereof and may have an integral end piece adaptor subassembly 530 at another end thereof for threaded engagement with a corresponding female adaptor segment 350 of FIG. 4B within an adjacent rod segment 110 of FIG. 2B.

The end piece assembly 500 may be fabricated of solid Zircaloy and does not necessarily have any nuclear fuel (enriched uranium) or poisons (gadolinium) loaded therein, since axial flux near the top and bottom of a fuel bundle such as fuel bundle 10 of FIG. 1A is generally substantially lower than between the upper and lower end pieces 120 and 130 of FIG. 2A, for example. FIGS. 5A and 5B thus may illustrate a reusable end plug (reusable as either an upper end piece or lower end piece) that can be removed with relative ease from an adjacent segment 110 of FIG. 2B of the rod assembly 100 of FIG. 2A during a scheduled maintenance outage.

FIGS. 6A-6E are views illustrating an exemplary container assembly with contents adapted for insertion in a given rod segment 110 of the rod assembly 100 of FIG. 2A, in accordance with an exemplary embodiment of the invention.

In an exemplary embodiment of the present invention, various ones of the rod segments 110 may include a container assembly 600 therein, as shown previously in FIG. 2B. In an example, the container assembly 600 may house or contain selected contents. An example of such contents may be one or more irradiation targets that produce one or more desired isotopes when a fuel bundle containing the rod assembly 100 is irradiated in the core of the reactor. One or more rod segments 110 of the rod assembly 100 may each include the same target, different targets or multiple irradiation targets, for example.

Referring to FIGS. 2A and 2B, in one exemplary aspect of the invention, at least one of the rod segments 110 of rod assembly 100 includes a container assembly 600 therein, and none of the other rod segments 110 of rod assembly 100 (nor either of the end pieces 120, 130) contain any nuclear fuel/poisons. In another aspect, one or more of the rod segments 110 of rod assembly 100 may include desired enrichments of uranium and/or concentrations of gadolinia. The locations and concentrations may be based on the desired characteristics of the bundle 10 for a planned energy cycle, for example. A rod segment 110 that includes an irradiation target may not also include nuclear fuel, although adjacent rod segments 110 could include nuclear fuel therein.

Figure 6B:
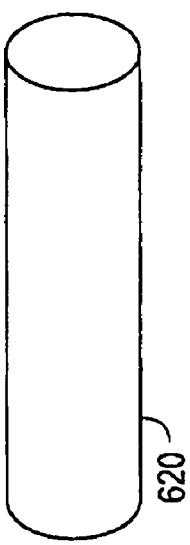
FIGS. 6A-6E are views illustrating an exemplary container assembly with contents adapted for insertion in a given rod segment of the rod assembly, in accordance with an exemplary embodiment of the invention.
Figure 6A:
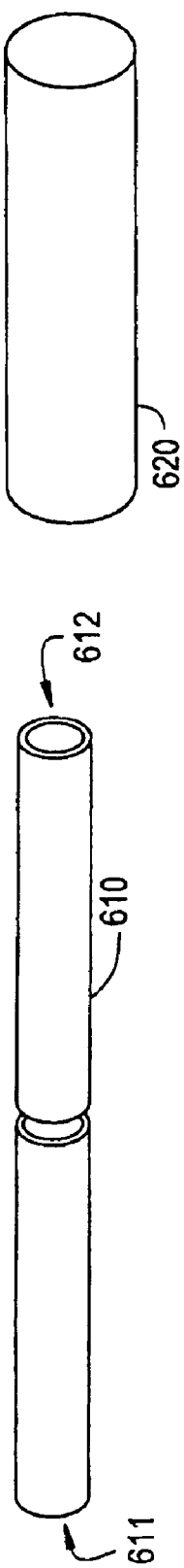
Figure 6D:
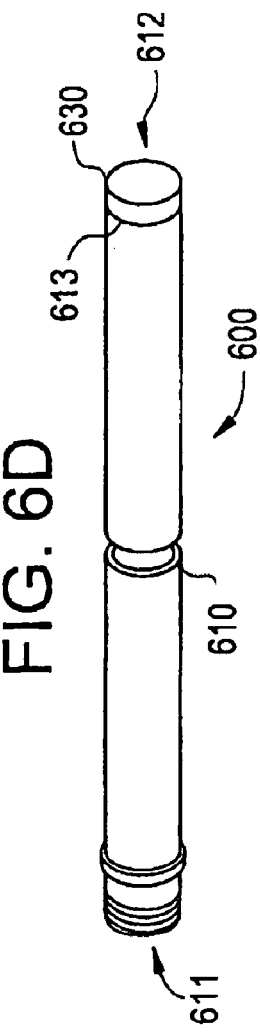
Figure 6C:
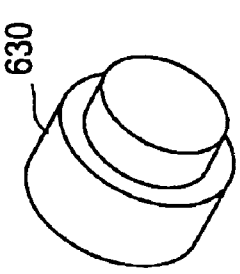

Referring now to FIGS. 6A-6E, the container assembly 600 shown initially in phantom in FIGS. 2A and 2B may include a container 610 that houses an irradiation target 620 therein. The container 610 may be closed at one end 611, open at the other end 612 and may include a seal 613 to close the container by a suitable end cap 630, as shown in FIG. 6D, although end caps 630 may be provided at both ends. Although container 610 is shown as having a generally cylindrical shape, container 610 may be oriented in any geometrical shape so long as the largest diameter of the shape is less than the inner diameter of rod segment 110. Container 610 may be made of a suitable material such as zirconium alloys, for example.

Container 610 may house one or more irradiation targets 620. The irradiation target 620 shown in FIG. 6B is illustrated in a generally cylindrical form or shape. However, the irradiation target 620 may be embodied as a solid, liquid and/or gas, and may take any geometry so long as the diameter of the geometry is small enough to fit inside the container 610 (less than an inner diameter of the container 610) within a given rod segment 110. The container 610, coupled with its cladded rod segment 110, therefore provides a double-walled containment for the irradiation target 620 when in place within the rod segment 110.

Figure 6E:
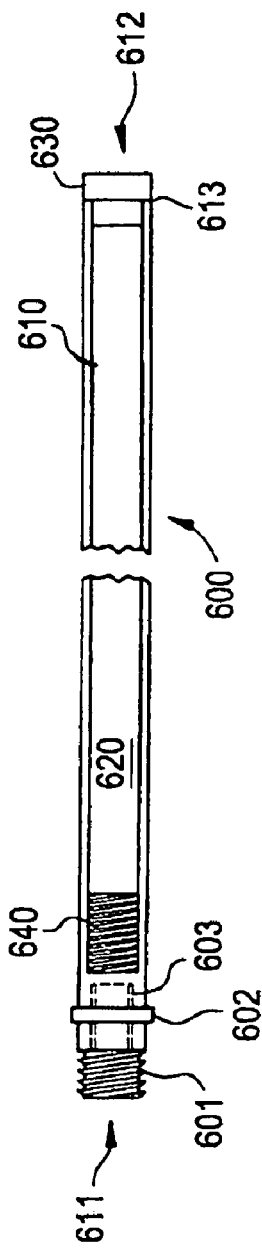

FIG. 6E illustrates a transparent front or side view of container assembly 600, to show the container 610 housing the irradiation target 620 therein and sealed by the end plug 630 at location 613. Optionally, an interior of the container 610 may include a spring 640 to provide a counter force against irradiation target 620 when sealed by end plug 630. The end plug 630 may be attached to the container 610 by suitable attachment means, i.e., weld, threaded engagement, friction connection, etc.

In another aspect, the container 600 houses irradiation target 620 therein, having a first end 611 that has a pilot hole 603 for removing the irradiation target 620 after irradiation. The first end 611 may include exterior threads 601 and an O-ring 602 that is used for sealing container 600 when inserted into a piece of equipment. Pilot hole 603 has interior threads to aid in the removal of container 600 from the rod segment 110.

The irradiation target 620 may be a target selected from the group of isotopes comprising one or more of cadmium, cobalt, iridium, nickel, thallium, thulium isotope, for example, or any other isotope having an atomic number greater than 3. Desirably, a given segment 110 and/or container assembly 600 may include indicia or indicators thereon to indicate what irradiation target 620 is loaded in that rod segment 110/container 600, for example, and/or what isotope is to be produced from that target. The specific methodology in which one or more of the rod assemblies 100 containing irradiation targets is irradiated within a fuel bundle (such as fuel bundle 10 of FIG. 1A) of a nuclear reactor to generate one or more desired isotopes is described in more detail in the co-pending and commonly assigned application by the inventors entitled "Methods of Producing Isotopes in Power Nuclear Reactors", Ser. No. 11/002,680. Therefore, a detailed discussion of these processes is omitted herein for purposes of brevity.

FIG. 7 illustrates a rod assembly for a fuel bundle in accordance with another exemplary embodiment of the invention. FIG. 7 illustrates a rod assembly 100' in accordance with another exemplary embodiment of the present invention. In FIG. 7, only a few rod segments 110 of the rod assembly 100' are shown for purposes of brevity, it being understood that the rod assembly 100' could include additional rod segments 110 and spacers 20. In an example, the fuel bundle 10 may include eight spacers 20 with various sized (different length) rod segments 110 attached to the upper and lower end pieces 120 and 130 with an expansion spring 125 attached atop the upper end piece 120, as is known in the art.

Unlike FIG. 2A, in FIG. 7 various sized adaptor 'mini-subassemblies' 300a may be provided at various locations such that connection points between two adjacent rod segments 110 do not occur at the spacer location (i.e., at spacer 20). FIG. 7 also illustrates an undercut section 160 (segmented break line 360 in FIG. 2B) as well as a container assembly 600' in further detail. As it may be desirable to have additional locations to more easily remove rod segments 110 which include a container assembly 600' therein (for removal of the container assembly 600' and shipping to a desired customer), the rod assembly 100' may include different length adaptor subassemblies 300, such as mini-subassemblies 300a and extended sub-assemblies to use between adjacent rod segments 110 of different lengths, for example. One or more of the rod assemblies 100' shown in FIG. 7 may be inserted into a fuel bundle such as the fuel bundle 10 shown in FIG. 1A. Additionally, a rod assembly 100 or 100' could have both adaptor subassemblies 300 at spacer 20 locations as well as one or more mini-subassemblies 300a between spacers 20 for connecting adjacent rod segments 110, and/or for connecting a rod segment 110 to one of an upper or lower end piece 120, 130 (as shown in FIG. 2A) or one of an upper end piece assembly 1000 and a lower end piece assembly 1100 as shown in FIG. 7.

As also shown in FIG. 7, a given rod segment 110 may include multiple container assemblies 600' therein. In FIG. 7, the container assembly 600' may include a plurality of irradiation targets in "BB" form, which is another alternative form for the irradiation target in accordance with the present invention.

Accordingly, as shown in FIG. 7, the rod assembly 100' may include various sized adaptor mini-subassemblies 300a which may be used in addition to the fixed-size adaptor subassembly 300 described in FIG. 2A. This may produce a single multi-joint rod assembly 100' that has more than one usage. This utilizes varying levels of neutron flux in the reactor for variations in the degree of isotope production in the target.

As an example, the rod assembly 100' may contain a plurality of irradiation targets at various locations within different sized rod segments 110, and still maintain the same length of a standard full length fuel rod 18 or part length rod 19 within a fuel bundle 10 of FIG. 1A, and/or provide a rod assembly 100' having the same length as a part length rod within fuel bundle 10 of FIG. 1A, for example. Different rod segments 110 of the rod assembly 100' may be removed and/or reconnected at different connection points along the axially length of the rod assembly 100'. A given rod segment 110 and/or adaptor mini-subassembly 300a may be removed by unscrewing, cutting and/or snapping or breaking a specific section loose at its connecting point or at the undercut section 160, for example.

Additionally as shown in FIG. 7, irradiation targets 620 may be placed in prepackaged container assemblies 600' that may facilitate shipping directly from the reactor site to the receiving customer. Such prepackaged containers 600' may contain different irradiation target materials, whether the target isotopes are in solid, liquid or gas form and placed inside a rod segment 110. For example, such is shown in FIG. 13, which illustrates the multi-segmented fuel rod 100' of FIG. 7 in further detail. The multi-segmented fuel rod 100' is broken up into various segments 110A, 110B, 110C, 110D, 110E, 110F and 110G that connect to each other via a corresponding adaptor subassembly 300 at connection points 115 (as previously shown) to form a contiguous multi-segmented fuel rod 100' (as evident by the dotted connection lines 111 in FIG. 13). FIG. 13 also illustrates enlargements of cross-sectional views I-VII of the target container 600' in each of segments 110A, 110C, 110E, 110F and 110G of the multi-segmented rod 100'.

Enlarged views I and II show a plurality of containment structures 600' within rod 100' that are housing multiple different targets, shown as a liquid, solid and a gas target 620 within a single rod segment 110A. Further, enlargements I and II illustrate indicia 650 that can be placed on the containment structures 600' within a given rod segment 110A, 110C, 110E, etc. As shown, the indicia 650 can indicate whether or not the target is in solid, liquid or gas form, and can also provide the name of the target isotope and/or the name of the isotope to be produced due to irradiation, for example (not shown in FIG. 13 for purposes of clarity).

Rod segments 110B and 110D are shown to contain nuclear fuel 660, as shown in enlargements III and IV, for example. Of course in an alternative, multi-segmented rod 100' can be composed of a plurality of rod segments 110 in which no segment 110 includes nuclear fuel, as previously described. Enlargement V of rod segment 110e illustrates a container assembly 600' which includes a target that is in gaseous form. Enlargement VI of rod segment 110F illustrates a container assembly 600' within the rod segment 110f that includes a target 620 in liquid form. Enlargement VII of rod segment 110G illustrates a container assembly 600' which includes a solid target 620, shown as a single column of Co-59BBs, which can be irradiated to produce the desire isotope, in this case, Co-60. Each of the container assemblies 600' can thus be prepackaged with the target 620 isotope material in solid, liquid or gas form, for insertion into a corresponding rod segment 110 of the multi-segmented rod 100', for example.

Further, since each of the container assemblies 600' are sealed by end plugs 630 at one end 612 and by exterior threads 601 and an O-ring 602 at the first end 611 (as previously shown in FIGS. 6A, 6D and 6E), the removal of a particular segment 110 at its connection point 115 (i.e., at the disconnection of the adapter subassembly 300 at connection point 115 between two segments 110) will not cause a breach which would expose the irradiation target 620 to the reactor coolant. Thus, the container assembly 600' together with the outer cladding of the rod segment 110 provides a double-walled containment for the irradiation target 620.

Figure 8A:
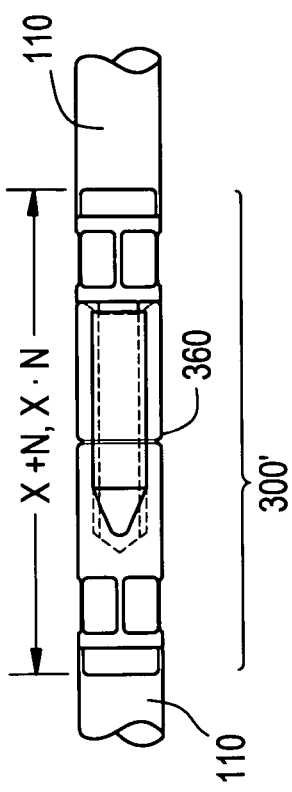
FIGS. 8A-B are views illustrating an adaptor subassembly for the rod assembly in accordance with another exemplary embodiment of the invention.
Figure 8B:
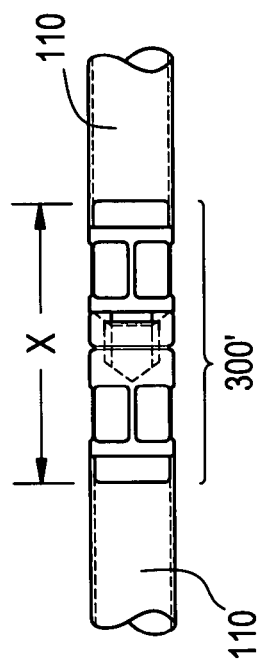
Figure 9A:
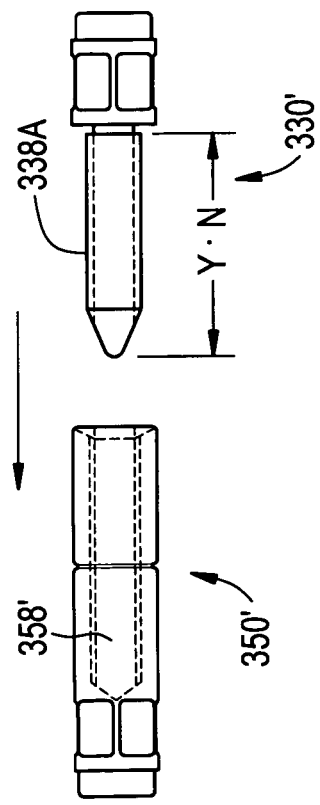
FIGS. 9A-B are views illustrating a a mini-subassembly for the rod assembly in accordance with another exemplary embodiment of the invention.
Figure 9B:
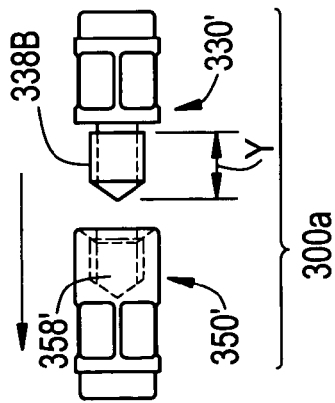

FIGS. 8A-8B are views illustrating an adaptor subassembly for the rod assembly in accordance with another exemplary embodiment of the invention; and FIGS. 9A-9B illustrate the mini-subassembly 300a in further detail. FIG. 8A shows a male adaptor plug 330' and a direction of insertion into the female adaptor plug 350'. FIG. 8B illustrates the connective engagement between male and female adaptor plugs 330', 350' as part of an exemplary adaptor subassembly 300'.

FIGS. 8A and 8B illustrate a longer-length adaptor subassembly 300' than is shown in FIGS. 3A-3B and FIGS. 4A-4B, or in FIGS. 9A-9B. For example, the longer elongate section 338A of the longer male adaptor segment 330' may provide an adaptor subassembly 300' which enables connection of a smaller length section of rod segment 110 to be interchangeable with a much longer/heavier rod segment 110, should the need arise. In FIG. 8A, the length of the longer elongate section 338A is indicated as "y * n" so as to distinguish it from the length of the shorter elongate section 338B in the mini-subassembly 300a of FIG. 9A. Similarly, the overall length of the adaptor subassembly 300' in FIG. 8B may be longer than the corresponding mini-subassembly 300a in FIG. 9B by an integer multiple n, or by an addition of an integer n to the length 'x' of mini-subassembly 300a in FIG. 9B.

The smaller, two-piece mini-subassembly 300a of FIGS. 9A-B may be used in between spacer 20 locations for producing even smaller subassemblies of rod segments 110. The smaller two piece adaptor mini-subassembly 300a of FIG. 9B may be used in the same rod assembly 100' as the larger two piece adaptor subassembly 300' shown in FIG. 8B, for example.

Figure 10B:
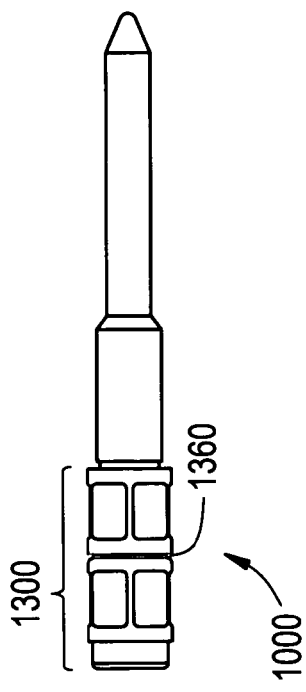
FIGS. 10A-B are views illustrating an upper end plug adaptor for the rod assembly in accordance with another exemplary embodiment of the present invention.
Figure 11B:
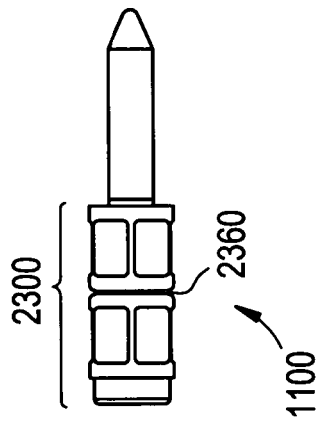
FIGS. 11A-B are views illustrating an lower end plug adaptor for the rod assembly in accordance with another exemplary embodiment of the present invention.
Figure 10A:
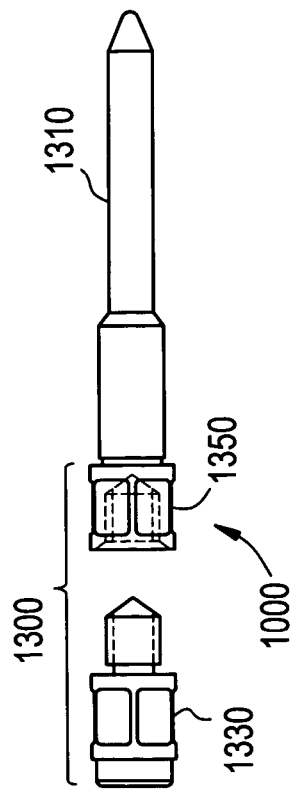
Figure 11A:
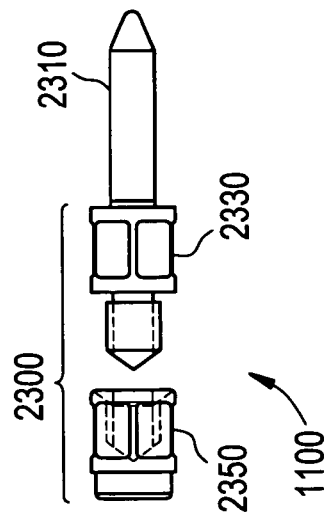

FIGS. 10A-B are views illustrating an upper end piece adaptor for the rod assembly in accordance with another exemplary embodiment of the present invention. FIGS. 11A-B are views illustrating a lower end piece adaptor for the rod assembly in accordance with another exemplary embodiment of the present invention.

FIGS. 10A-11B illustrate alternative embodiments to the end piece assembly 500 shown in FIGS. 5A and 5B. FIGS. 10A and 10B illustrate an upper end piece assembly 1000. The upper end piece assembly 1000 may include an upper end piece adaptor subassembly 1330 at one end and the upper end piece 1310 connected thereto at another end, which may contain threads. Unlike the integral end piece assembly 500 shown in FIGS. 5A and 5B, in FIGS. 10A and 10B, the upper end piece 1310 is attached to a female adaptor plug 1350 similar to the female adaptor plug 350 as described in FIGS. 4A and 4B. The female adaptor plug 1350 may be engaged to the male adaptor plug 1330 such as previously described above in FIGS. 3A-3B. The upper end piece subassembly 1000 allows a full length rod from its upper end piece 1310 down to its bottom end piece 2310 to be built by mixing and matching different lengths of rod segments 110 to different connection points within the same axial length of the rod assembly 100'.

Similarly, in FIGS. 11A and 11B, a lower end piece assembly 1100 may include a lower end piece adaptor subassembly 2300 connected to the lower end piece 2310. In particular, the lower end piece 2310 is attached to the male adaptor plug 2330, which mates with a female adaptor plug 2350 that is attached to an adjacent rod segment 110, for example. In an aspect, the lower end piece may be used after the removal of a lower section of a rod segment 110, so that the remaining axial length of the rod assembly 100' can remain within the bundle 10 for additional cycles using the detachable lower end piece assembly 1100.

Accordingly, the upper end piece assembly 1000 and lower end piece assembly 1100 provide reusable and removable lower and upper end pieces which can facilitate quick repairs or removal of designated rod segments 110 within the rod assembly 100'.

Figure 12A:
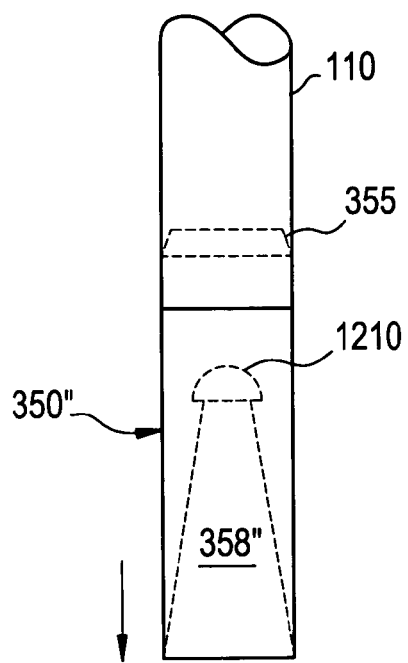
FIGS. 12A-C are views illustrating an adaptor subassembly for the rod assembly in accordance with another exemplary embodiment of the invention.
Figure 12B:
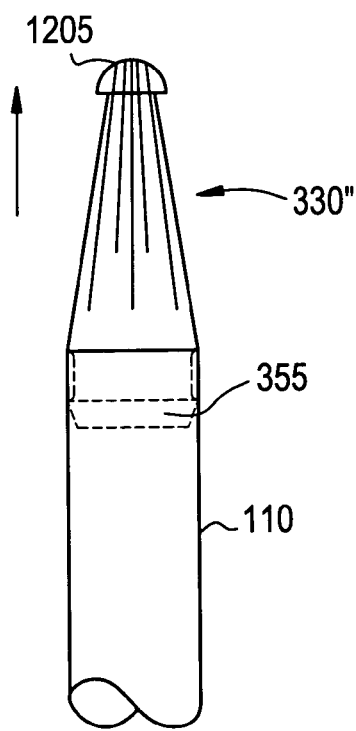
Figure 12C:
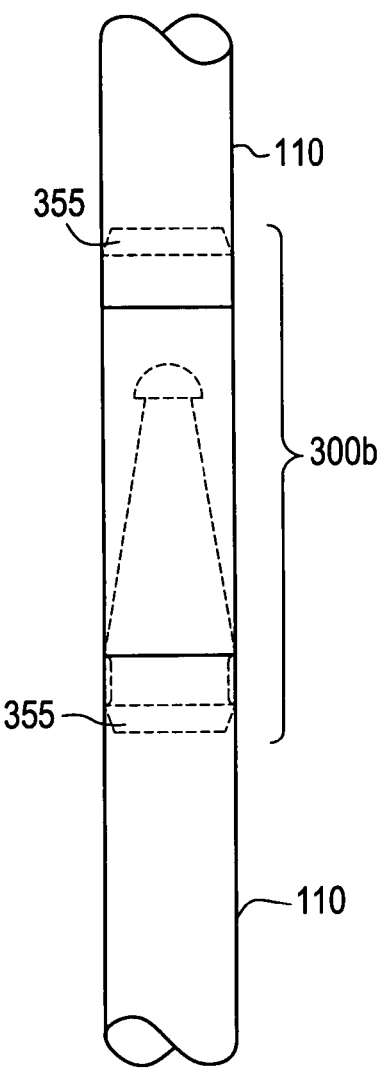

FIGS. 12A-C are views illustrating an adaptor subassembly for the rod assembly in accordance with another exemplary embodiment of the invention. In general, adaptor subassembly 300b may be understood as a push-snap locking mechanism having a male connector 330" engaging a corresponding female connector 350" to connect two rod segments 110 or a rod segment 110 with one of the upper and lower end pieces 120/130 of FIG. 2A. The male connector 330" may include an expandable member at an end thereof, and the female connector 350" may include an interior cavity terminating in a receiver that is adapted to receive the expandable member.

FIGS. 12A and 12B illustrates a male connector 330" and female connector 350" and direction of connective engagement between the two connectors 330", 350". As shown in FIG. 12B, the male connector 330" may include a weld alignment member 355 (such as shown in FIG. 2B) to assist in aligning the male connector 330" within the interior of its corresponding rod segment 110. The other end of the male connector 330" may include a spring plug bayonet 1205 for connective engagement within an interior cavity 358" to terminate once fully engaged within a corresponding ball and socket joint fit-up 1210 of the female connector 350".

FIG. 12A illustrates a female connector 350" with the interior cavity 358" that may be shaped so as to receive the spring plug bayonet 1205 within the corresponding ball and socket joint fit-up 1210, as shown in FIG. 12A. FIG. 12C illustrates the connective engagement between the female 350" and male 330" connectors of connector subassembly 300b. Accordingly, the rod segments 110 may be fully assembled into a singular rod assembly 100/100' once the expandable bayonet plug spring collet 1205 is fixedly secured within the ball and socket joint fit-up 1210 of the female connector 350".

Accordingly, the adaptor subassembly 300b in FIGS. 12A, 12B and 12C illustrate a push-snap mechanism to connect adjacent rod segments 100 of the rod assembly 100/100' and may reduce the sticking probability that could occur using the threaded engagement as shown in FIGS. 2A, 2B and 7. This may lead to fast assembly and/or disassembly of various rod segments 110, without the need for breaking, snapping, or cutting the segments 110 apart, for example.

As previously described, each of the rod segments 110 may have identification marks or indicia thereon that identify the contents that are within that particular rod segment 110. Alternatively, the identification marks can be labeled on the container assemblies 600/600' within a given rod segment 110, for example.

In another aspect, the threaded screw length of the elongate sections 338/338A/338B of FIGS. 8A-B and 9A-B on a given male adaptor plug 330 may be of a sufficient length so that a given rod segment cannot become unscrewed during a reactor operation. As an example, the threaded screw length of the elongate sections 338/338A/338B may be long enough such that it cannot come apart. This may help to ensure that a given rod length would not become unscrewed during reactor operation.

In a further aspect, male adaptor plugs 330 and 330', and/or male connector 330" may be oriented in the same direction for ease of extraction of a given rod segment 110. For example, segments 110 having male adaptor plugs 330, 330' and/or 330" may all be loaded and/or arranged in a given rod assembly 100/100' so that the male adaptor plugs/connector 330, 330', 330" of the segment 110 extend vertically upward toward the top of bundle 10, to facilitate grasping by a suitable tool for removal, installation, for example. In the event the rod segment 110 is dropped, it would land with side having the female adaptor plug 350, 350' and/or 350" down, so as to reduce the chance that the male end snaps or breaks.

Accordingly, the exemplary rod assembly with multiple rod segments connected thereto may provide a full length or part length rod. The rod assembly 100 may include adaptor subassemblies 300 which connect adjacent rod segments 110 at spacer 20 locations so as to eliminate the consequences of fretting that is currently prevalent in full length and part length rods of conventional fuel assemblies. In an aspect, the use of multiple rod segments 110 in a full length or part length rod assembly 100 or 100' may allow for multiple irradiation targets to be loaded at different segments and at different axial locations of the rod assembly 100/100'. This may allow for multiple isotopes to be generated in each fuel bundle of a reactor, should the reactor be configured solely for generating isotopes and/or for generating isotopes and providing power generation, and also enables the ability to place irradiation targets at desired flux locations along the axial length of the rod within a given fuel bundle.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed:

1. A fuel bundle for use in a nuclear reactor, the fuel bundle comprising:
    a plurality of rods, at least one of the rods being a multi-segment rod, each multi-segment rod including,
        a plurality of rod segments,
        the rod segments being removably mated to each other in an axial direction,
        the rod segments being individually cladded,
        the rod segments forming a continuous multi-segment rod having continuous cladding in the axial direction when so mated in the axial direction,
        at least one rod segment being an adaptor subassembly containing no irradiation target,
        at least one irradiation target within a rod segment; and
    a plurality of spacers, each spacer being spaced apart from other spacers in the axial direction, each spacer directly contacting only an adaptor subassembly along the axial length of the multi-segment rods.

2. The multi-segment fuel rod of claim 1, wherein the at least one irradiation target does not include nuclear fuel.

3. The multi-segment fuel rod of claim 2, wherein another of the at least one irradiation target includes nuclear fuel.

4. The multi-segment fuel rod of claim 1, wherein the at least one irradiation target is an isotope with an atomic number greater than 3.

5. The multi-segment fuel rod of claim 1, wherein at least one rod segment contains a plurality of irradiation targets.

6. The multi-segment fuel rod of claim 1, wherein
at least one rod segment contains at least one container assembly, the container assembly including,
a first end,
a second end,
at least one of the irradiation targets, and
an end cap configured to attach to at least one of the first and the second end to seal the irradiation target inside of the container assembly.

7. The multi-segment fuel rod of claim 6, wherein the container assembly includes an exterior indicia indicating the irradiation target contained therein.

8. The multi-segment fuel rod of claim 6, wherein the container assembly and the rod segment containing the container assembly are sealed so as to provide double containment for the irradiation target.

9. The multi-segment fuel rod of claim 1, wherein the rod segments are removably mated by at least one of an adaptor plug and receptor, a screw and threaded opening, and a tang and receptor.

10. The multi-segment rod of claim 1, wherein the irradiation target is Cobalt-59 that becomes Cobalt-60 when exposed to neutron flux.

11. A method of fabricating a fuel bundle, the method comprising:
forming a plurality of rods, at least one of the rods being a multi-segment rod, the forming the at least one multi-segment rod including,
placing at least one irradiation target within at least one of a plurality of rod segments,
mating the plurality rod segments to each other in an axial direction, the rod segments being individually cladded, such that the rod segments form a continuous multi-segment rod having continuous cladding in the axial direction when mated, at least one of the mated rod segments being an adaptor subassembly containing no irradiation target; and
forming a fuel bundle including a plurality of spacers and the plurality of rods by placing the plurality of rods into the plurality of spacers such that each of the spacers directly contacts only an adaptor subassembly along the axial length of the at least one multi-segment rod.

12. The method of claim 11, wherein the placing the at least one irradiation target includes,
placing the at least one irradiation target into at least one container assembly, the container assembly including a first end, a second end, the at least one irradiation target,
sealing the at least one irradiation target inside of the container assembly with an end cap configured to attach to at least one of the first and the second end, and
placing the at least one container assembly into the at least on of the plurality of rod segments.

13. The method of claim 12, further comprising:
providing an exterior indicia on the container assembly, the exterior indicia indicating the at least one irradiation target contained therein.

14. The method of claim 11, wherein the mating includes at least one of mating an adaptor plug and receptor, mating a screw and threaded opening, and mating a tang and receptor.

* * * * *